United States Patent
van Stiphout

(10) Patent No.: US 10,562,453 B2
(45) Date of Patent: Feb. 18, 2020

(54) ADJUSTMENT INSTRUMENT FOR AN EXTERIOR VISION UNIT FOR A VEHICLE

(71) Applicant: MCi (Mirror Controls International) Netherlands B.V., Woerden (NL)

(72) Inventor: Paulus Gerardus Maria van Stiphout, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 65 days.

(21) Appl. No.: 15/771,764

(22) PCT Filed: Oct. 28, 2016

(86) PCT No.: PCT/NL2016/050754
§ 371 (c)(1),
(2) Date: Apr. 27, 2018

(87) PCT Pub. No.: WO2017/074193
PCT Pub. Date: May 4, 2017

(65) Prior Publication Data
US 2018/0345862 A1    Dec. 6, 2018

(30) Foreign Application Priority Data
Oct. 28, 2015    (NL) .................................... 2015676

(51) Int. Cl.
*B60R 1/074*    (2006.01)
*B60R 1/072*    (2006.01)

(52) U.S. Cl.
CPC .............. *B60R 1/074* (2013.01); *B60R 1/072* (2013.01)

(58) Field of Classification Search
CPC . B60R 1/072; B60R 1/074; B60R 2001/1215; B60R 2001/1253
(Continued)

(56) References Cited

U.S. PATENT DOCUMENTS 5,636,071 A * 6/1997 Mochizuki .............. B60R 1/074
                                                    248/476
6,022,113 A * 2/2000 Stolpe ..................... B60R 1/074
                                                    248/479

(Continued)

FOREIGN PATENT DOCUMENTS

WO    2012/047104 A1    4/2012

OTHER PUBLICATIONS

Search Report issued in corresponding WO Application No. 2017/074193A1 dated Feb. 16, 2017.

*Primary Examiner* — Ricky D Shafer
(74) *Attorney, Agent, or Firm* — Volpe and Koenig P.C.

(57) ABSTRACT

The invention concerns an adjustment instrument for an exterior vision unit for a vehicle. The adjustment instrument comprises a housing which is pivotably adjustable relative to a base between a park position and an overfold position via a drive position. The adjustment instrument furthermore comprises an electric drive unit provided in the housing, which cooperates via an output element with a driving ring provided with force transmission cams. The force transmission cams in the drive position are supported on a housing cam track of the housing, and upon electrically driven pivoting of the housing are supported on a base cam track of the base. In and near the drive position the force transmission cams can cooperate directly with the housing.

10 Claims, 11 Drawing Sheets

(58) Field of Classification Search
USPC .................................................. 359/841, 877
See application file for complete search history.

(56) References Cited

U.S. PATENT DOCUMENTS

| | | | | |
|---|---|---|---|---|
| 6,130,514 | A * | 10/2000 | Oesterholt | B60R 1/074 |
| | | | | 248/479 |
| 6,322,221 | B1 * | 11/2001 | van de Loo | B60R 1/074 |
| | | | | 359/841 |
| 7,543,949 | B2 * | 6/2009 | van den Brink | B60R 1/074 |
| | | | | 248/479 |
| 7,547,855 | B2 * | 6/2009 | Brouwer | B60R 1/074 |
| | | | | 200/405 |
| 7,847,205 | B2 * | 12/2010 | Brouwer | B60R 1/074 |
| | | | | 200/405 |
| 2008/0297927 | A1 * | 12/2008 | Onuki | B60R 1/074 |
| | | | | 359/841 |
| 2009/0229962 | A1 | 9/2009 | Brouwer et al. | |
| 2009/0303625 | A1 * | 12/2009 | van Stiphout | B60R 1/0617 |
| | | | | 359/841 |
| 2011/0069406 | A1 * | 3/2011 | Hwang | B60R 1/074 |
| | | | | 359/841 |
| 2011/0235200 | A1 * | 9/2011 | Sakata | B60R 1/074 |
| | | | | 359/841 |
| 2013/0321941 | A1 * | 12/2013 | van Stiphout | B60R 1/074 |
| | | | | 359/877 |

* cited by examiner

D,S1,A1

S2,A1

S2,A2

S2,A2,P

S2,A2,P

S2,A2

S2,A1

S1,A1,D

P,S2,A2

S2,A2

S2,A2

S2,A1,D

ADJUSTMENT INSTRUMENT FOR AN EXTERIOR VISION UNIT FOR A VEHICLE

CROSS REFERENCE TO RELATED APPLICATION

This application is a 35 USC § 371 National Stage application of International Patent Application No. PCT/NL2016/050754, which was filed Oct. 28, 2016, was entitled "Adjustment Instrument for an Exterior Vision Unit for a Vehicle" and is incorporated herein by reference as if fully set forth.

The invention relates to an adjustment instrument for an exterior vision unit for a vehicle.

Adjustment instruments for an exterior vision unit, such as an exterior mirror, exterior display and/or exterior camera, are used on vehicles, for example, automobiles. Such an adjustment instrument is generally known for the purpose of an exterior mirror unit and usually comprises a housing which is pivotably adjustable relative to a base to be coupled with the vehicle, between a park position, a drive position and an overfold position. In the park position, the exterior vision unit extends substantially along the vehicle, with, in the case of an exterior mirror unit, a mirror side facing the vehicle. In the drive position, the exterior vision unit is directed substantially transversely to the vehicle, with, in the case of an exterior mirror unit, the mirror side facing rearwards relative to the normal driving direction. In the overfold position, the vision unit extends substantially along the vehicle, with, in the case of an exterior mirror unit, the mirror side facing away from the vehicle. With other exterior vision units, whether or not in combination with an exterior mirror, these positions can be assumed by an exterior display and/or camera lens. An exterior display and/or camera lens may then, for instance, be arranged on the exterior vision unit roughly in the same position as an exterior mirror, but may also be arranged on the exterior vision unit in other positions.

Adjustment of the exterior vision unit may proceed electrically, for instance during normal use from the park position to the drive position and vice versa. The adjustment instrument is then provided with an electric drive with which the housing can be pivoted around the base. The electric drive is usually of self-locking construction.

The exterior vision unit may also be adjusted under the influence of an external force, for example in case of an impact such as a collision, or in manual operation. Thus, the exterior vision unit may be moved, for instance by collision with an object, from the drive position to the overfold position, or to the park position. Also, the exterior vision unit can for instance be moved manually from the park position to the drive position, and vice versa. The electric drive is provided with a break coupling, so that the electric drive can be decoupled upon operation under the influence of an external force exceeding a defined threshold value. Thus, damage of the drive can be prevented, which is especially important when the drive is of self-locking construction. After operation under the influence of an external force, the electric drive can be re-coupled again via the coupling in an electrically driven reset movement, for instance by carrying out an electrically driven reset movement towards the park position.

To counteract vibrations during use, it is important for the drive position to be well defined. Further, it is important that with manual operation, the housing can be operated uniformly in a movement that feels natural, and especially that the user feels a positive click when reaching the drive position, feeling resistance to both further pivoting and reverse pivoting. In practice, for this purpose, often a strong spring is used, which presses the housing onto the base continuously.

With electric adjustment, however, such a strong pressing-on of the housing or the base is less desirable, because it necessitates a relatively powerful driving motor in carrying out the adjustment movement. Because of such spring force, furthermore, upon adjustment under the influence of an external force, the drive may be subject to relatively large forces before uncoupling takes place. As a consequence, in practice, the components in the drive train of the drive must often must be made more force-resistant than is necessary for driving. From the viewpoint of costs, however, it is desirable to make the drive of lighter construction.

From WO2012047104, in particular the embodiment of FIG. 10, it is known, upon manual operation from the drive position, to transfer the uncoupling force via cooperating cam rings, and, during electric adjustment, to leave the housing free of spring force, so that the electric drive is relieved. This adjustment device provides many advantages in that the electric drive can be made of light construction, and works well in practice.

It is disadvantageous, however, that with electric adjustment from the park position back to the drive position, the cam rings do not always interlock properly.

An object of the invention is to provide an improved electrically adjustable adjustment instrument. In particular, the invention contemplates the provision of an adjustment instrument in which, with preservation of the advantages mentioned, at least one or more disadvantages of the known adjustment instrument are counteracted.

To this end, the invention provides an adjustment instrument for an exterior mirror unit for a vehicle comprising the features of claim 1. By virtue of the force transmission cams in the drive position being supported on the housing cam track, they can cooperate in and near the drive position directly with the housing, and thereby cause the cam rings to interlock better.

By, in accordance with the features of claim 2, providing the housing cam track with oblique flanks near a position corresponding to the drive position, the force transmission cams, in particular when the housing pivots from the park position to the drive position, can, by the movement along the housing cam track, press the housing cam ring and the base cam ring into each other. Such direct control of the interlocking of the cam rings is especially advantageous because the housing is not under spring action during electric operation.

By, in accordance with the features of claim 3, providing a break coupling via the locking ring, a simple and operationally reliable construction can be realized.

By, in accordance with the features of claim 4, providing the locking ring with a locking ring cam track, the spring force upon manual operation can be transmitted via the locking ring onto the housing. What can thus be achieved is that by the user upon manual adjustment an unequivocal click is perceived upon reaching the drive position, while in a so-called double detent, resistance is felt against both further pivoting and reverse pivoting.

By, in accordance with the features of claim 5, having the base cam track, the locking ring cam track and the housing cam track succeed each other relative to the longitudinal axis in radially outward direction, a compact construction can be realized, which cooperates with relatively simply implemented force transmission cams.

By implementing the cam rings in accordance with the features of claim 6, it can be achieved that cam rings in the raised axial position are very stably supported during pivoting.

Furthermore, by the use of a plurality, for example four or more, of cams located in a ring, it can be achieved that an external force that is exerted in the drive position, upon movement against the spring action out of the drive position, is absorbed by a relatively large surface of the cooperating cam rings. Upon departure from the drive position towards the park position under external force, the drive is subject only to minor forces because the driving ring can still perform a free stroke. By making the recess in the locking ring relatively shallow and gentle, the force that is thereupon exerted on the drive for operating the break coupling can be chosen to be relatively small.

As regards the disclosure in this application it is noted that the technical features of the adjustment device described in the main claim can also be seen as an invention independently or in combination with only one or more technical features from the main claim, the dependent claims or the description. Such technical features in the main claim to be considered separately are in any case:

1) a base, whether or not comprising a foot and base shaft extending therefrom along a longitudinal axis, which base is provided with a base cam track,
2) a housing surrounding the base shaft, whether or not one which is placed on the foot and which is pivotable around the longitudinal axis of the base shaft in an adjustment range, between a park position and an overfold position, via an intermediate drive position, which housing is furthermore provided with a housing cam track,
3) a base cam ring and a housing cam ring, whether or not ones which in the adjustment range interlock only in the drive position, and which upon pivoting of the housing relative to the base from the drive position along the longitudinal axis move apart, and upon further pivoting are supported on each other in a raised axial position,
4) an electric drive unit, whether or not one which is included in the housing, and is one which is provided with an output element for electrically adjusting the instrument,
5) a driving ring surrounding the base shaft, whether or not one which cooperates at its circumference with the output element of the electric drive unit, and which is provided with force transmission cams, wherein the driving ring with the aid of the electric drive is adjustable in a limited angular stroke relative to the housing and the base, between a first angular position corresponding to the drive position, in which the force transmission cams are supported on the housing cam track, and a second angular position in which the force transmission cams are supported on the base cam track,
6) a spring, whether or not one which surrounds the base shaft and which exerts a spring force on the driving ring along the longitudinal axis in the direction of the foot,
7) a locking ring surrounding the base shaft, whether or not one which is located between the housing and the driving ring, and which is nonrotatably coupled with the base and which is slidable along the longitudinal axis between a first axial position corresponding to the drive position, in which the locking ring leaves the driving ring free, and a second axial position in which it locks the driving ring against rotation disengageably via a break coupling.

The invention also relates to an exterior vision unit for a motor vehicle, comprising an adjustment instrument, and a mirror, display and/or camera coupled with the housing.

The invention will be further elucidated on the basis of an exemplary embodiment of an adjustment instrument which is shown in drawings. In the drawings.

Figure 4:
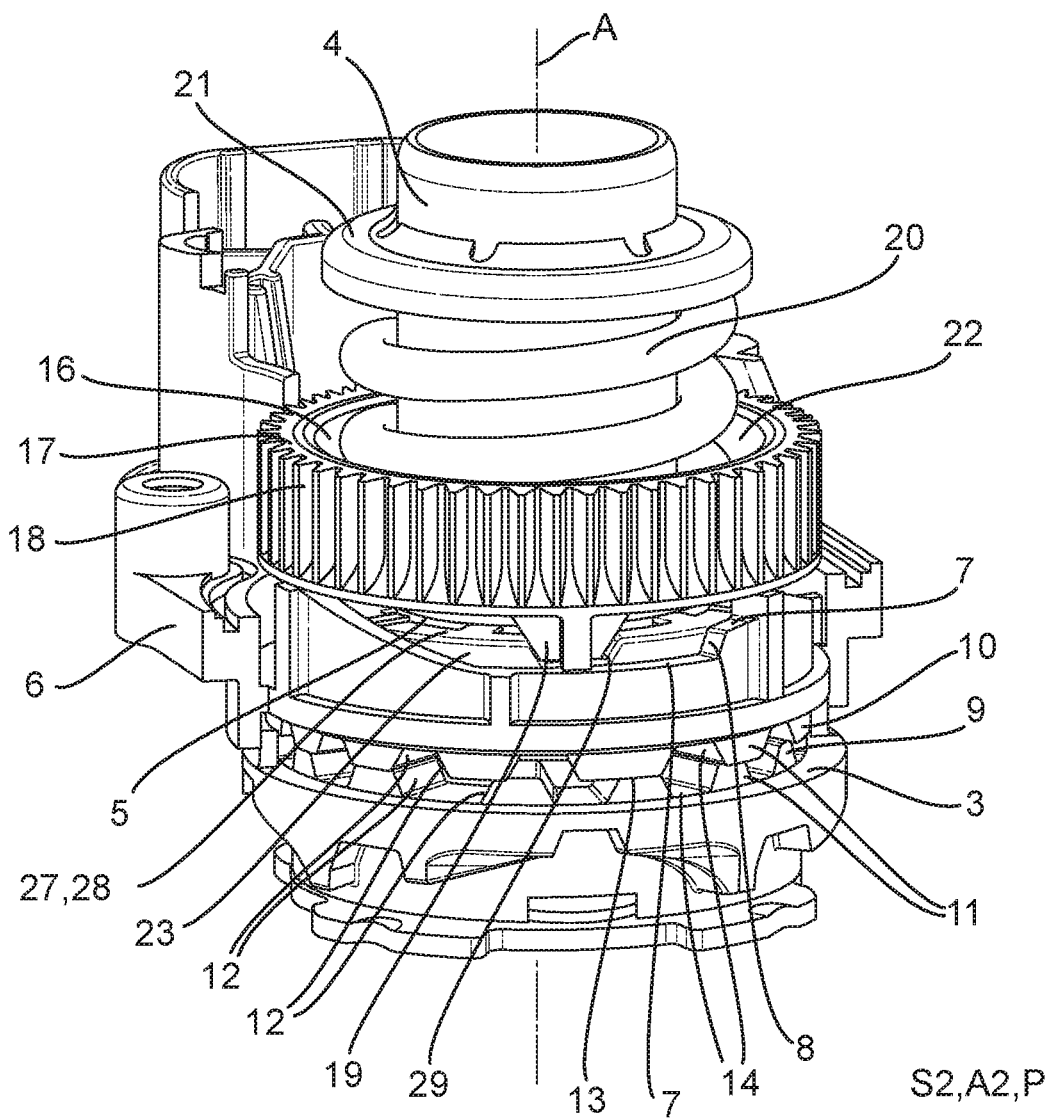
Figure 6A:
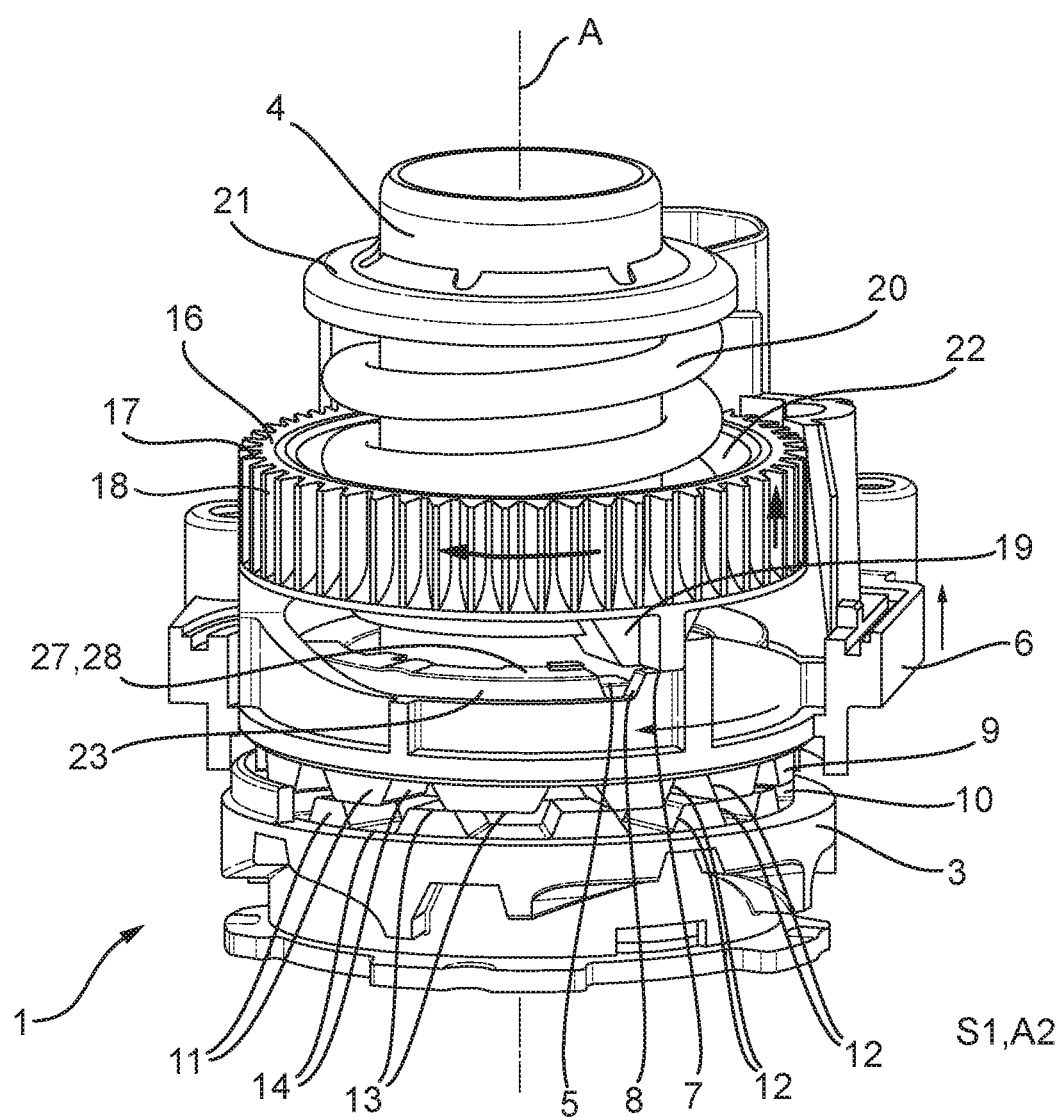
Figure 6B:
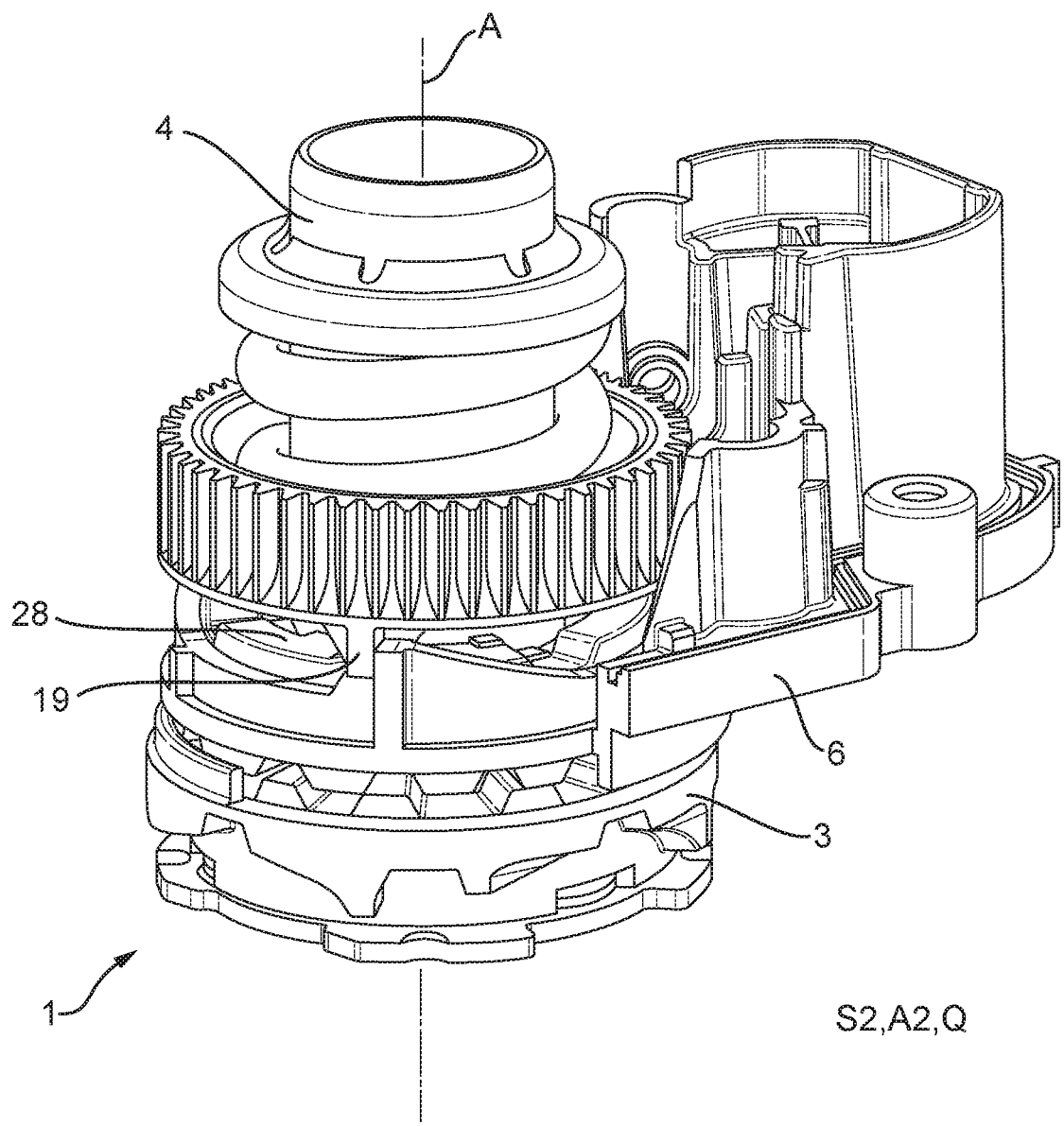
Figure 7A:
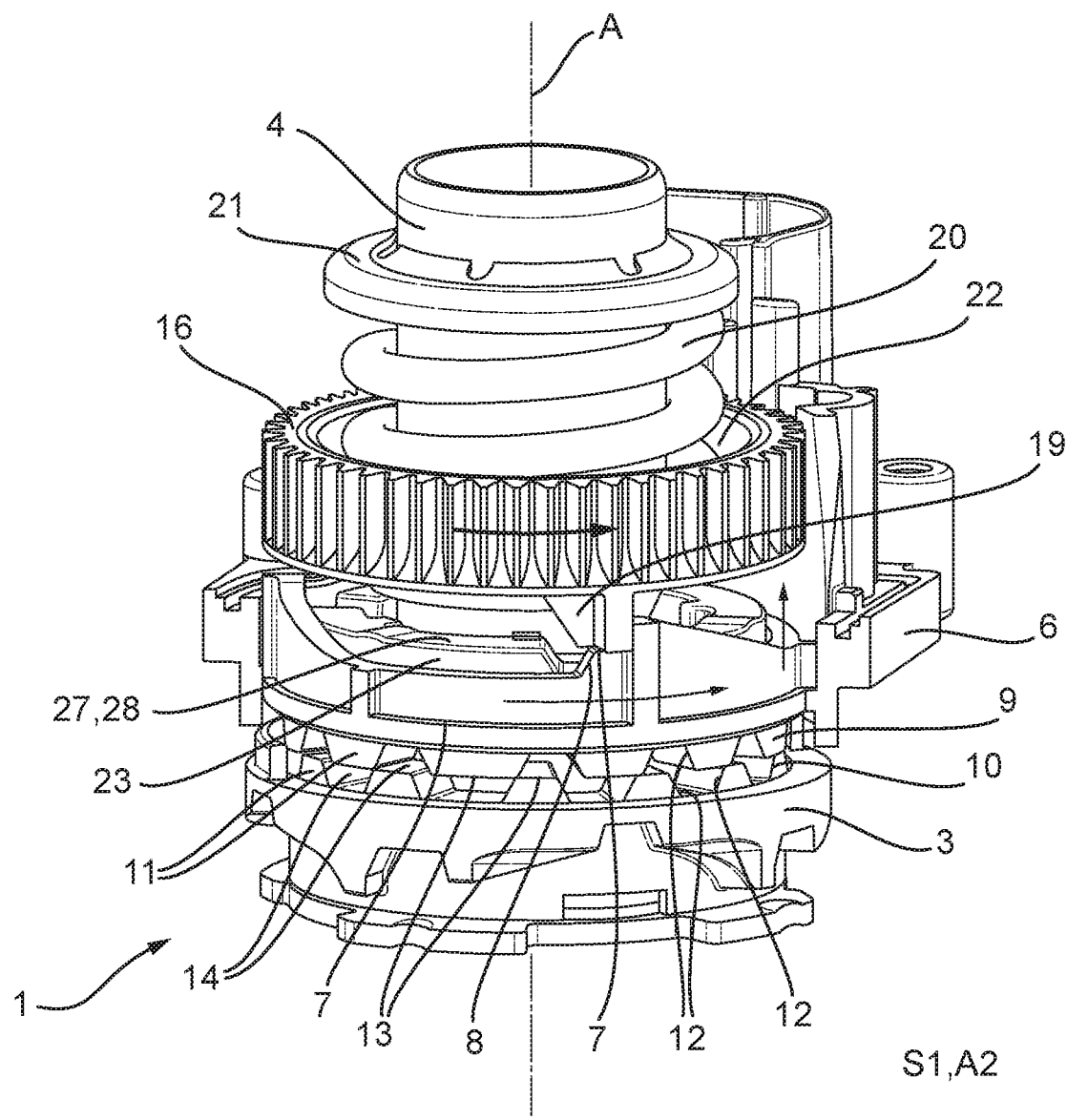
Figure 7B:
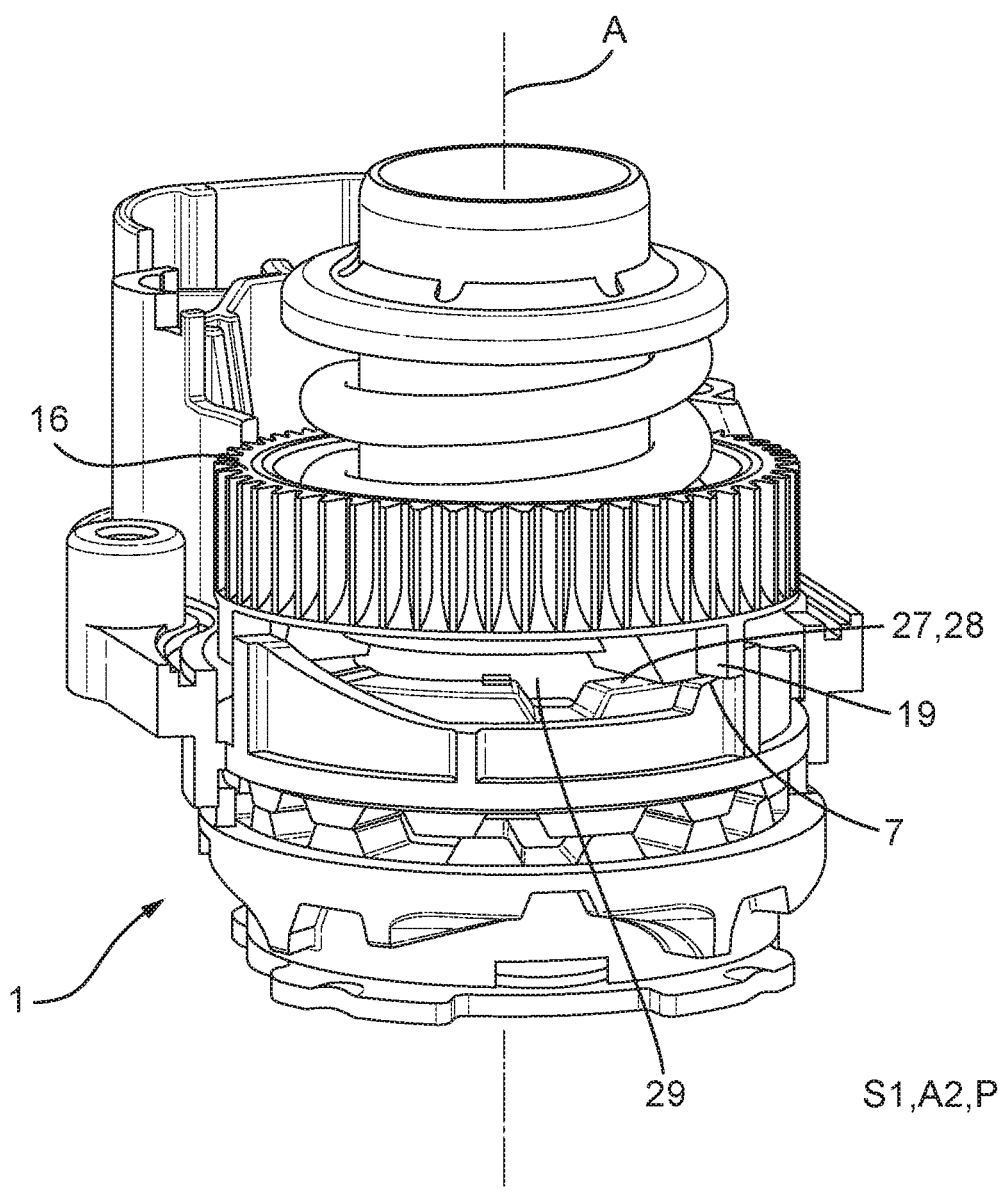
Figure 9A:
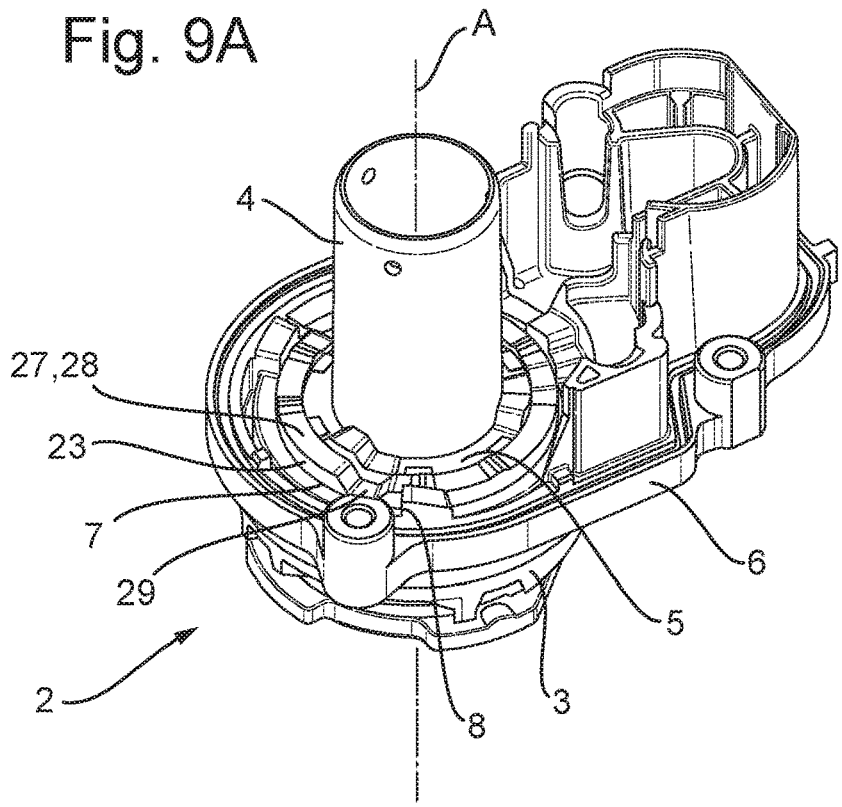
Figure 9B:
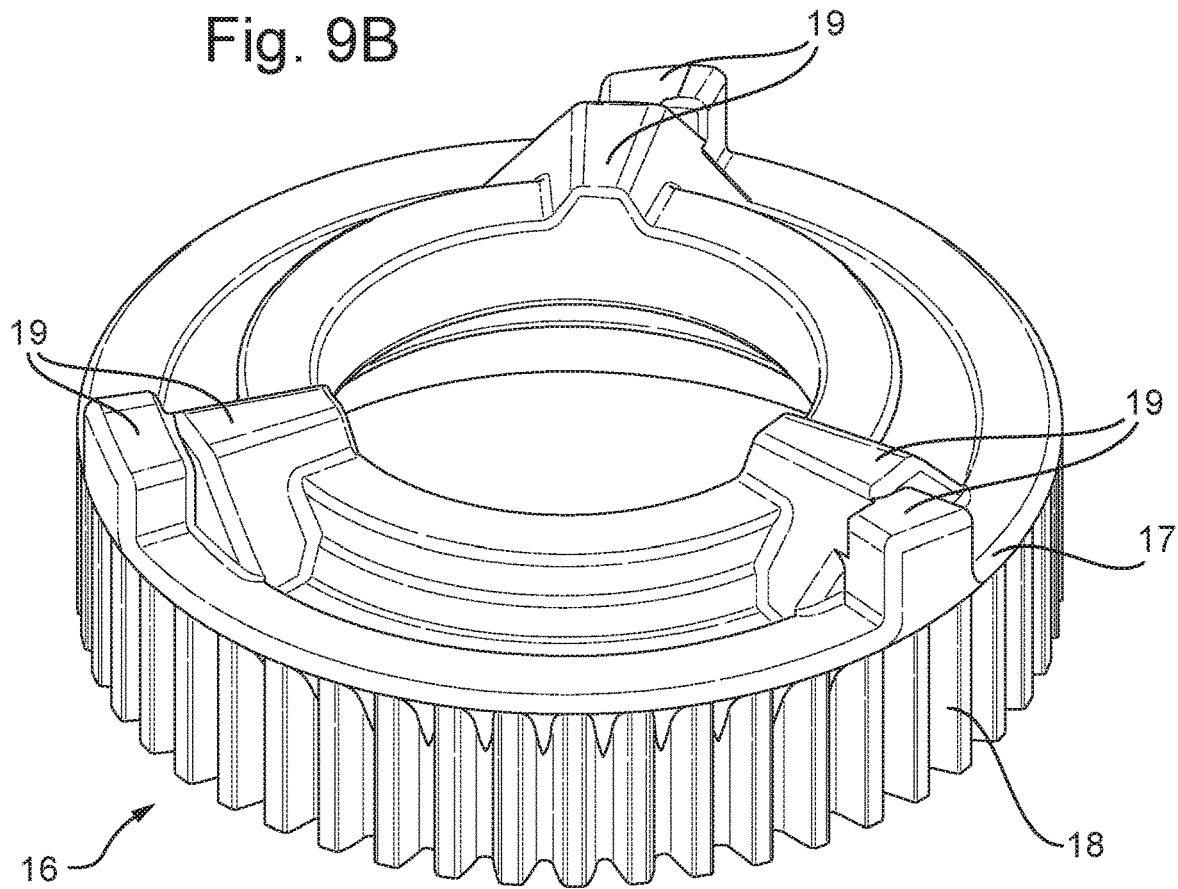

FIGS. 3a through 3d each show a schematic perspective view of the adjustment instrument according to the invention during electric adjustment from the drive position to the park position;

FIG. 4 shows a schematic perspective view of the adjustment instrument according to the invention in the park position;

FIGS. 5a through 5d each show a schematic perspective view of the adjustment instrument according to the invention during electric adjustment from the park position to the drive position;

FIGS. 6a and 6b each show a schematic perspective view of the adjustment instrument according to the invention during manual adjustment from the drive position to the overfold position;

FIGS. 7a and 7b each show a schematic perspective view of the adjustment instrument according to the invention during manual adjustment from the drive position to the park position;

FIGS. 8a-8d show a schematic perspective view of the adjustment instrument according to the invention during manual adjustment from the park position to the drive position;

FIGS. 9a and 9b show schematic perspective views of, respectively, the adjustment device in partly detached condition and the underside of the driving ring.

Figure 2:
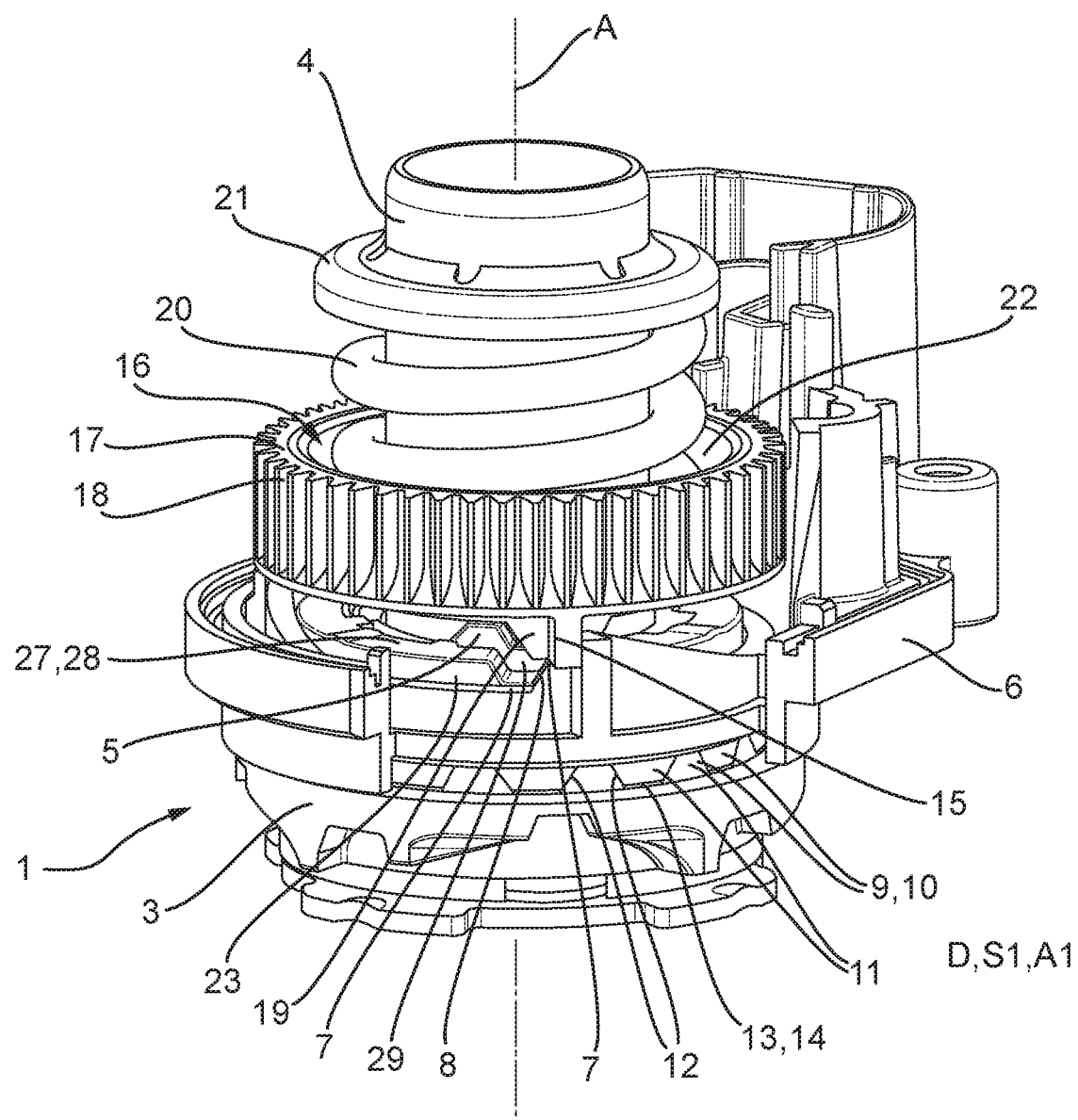
FIG. 2 shows a schematic perspective view of the adjustment instrument according to the invention in the drive position.
Figure 3A:
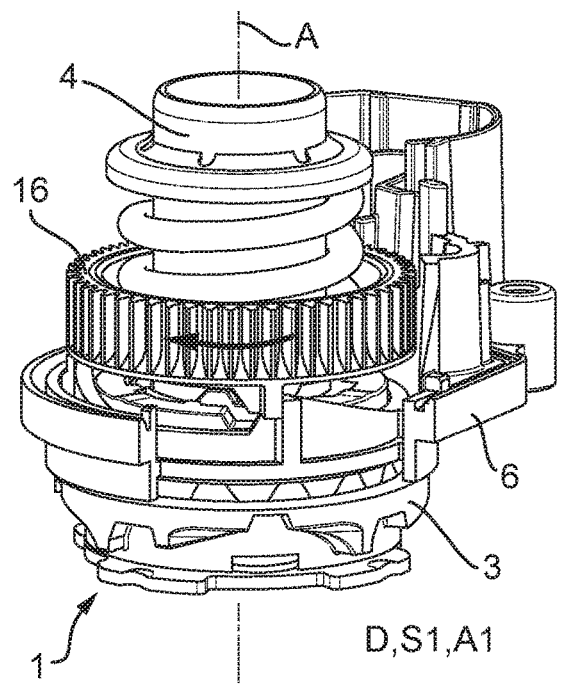
Figure 3B:
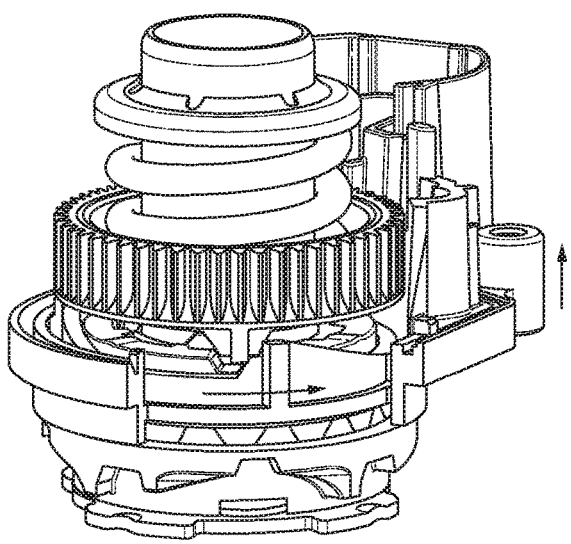
Figure 5A:
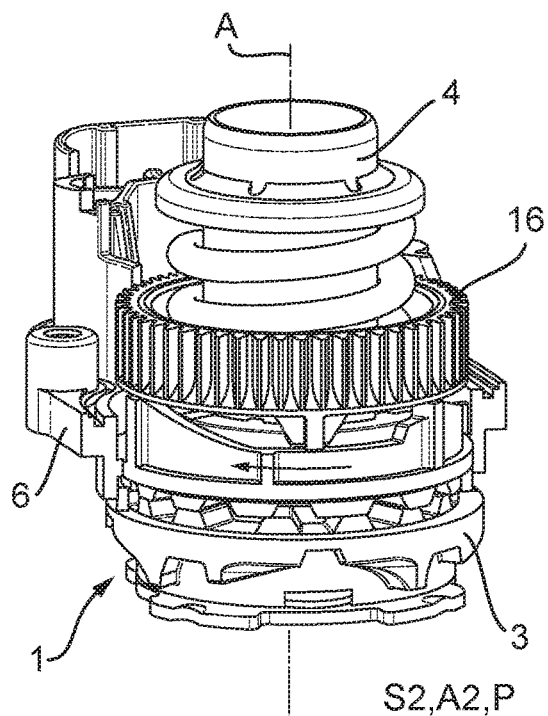
Figure 5B:
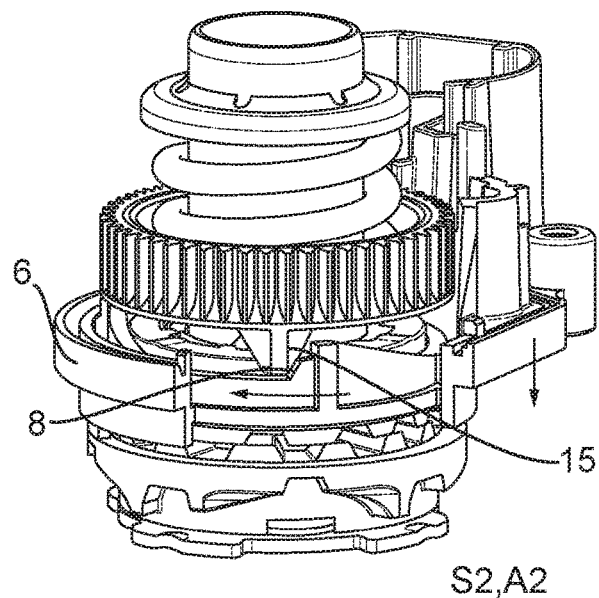
Figure 5C:
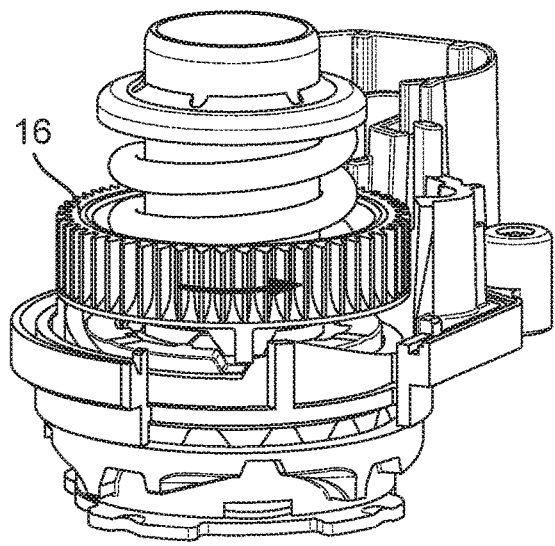
Figure 5D:
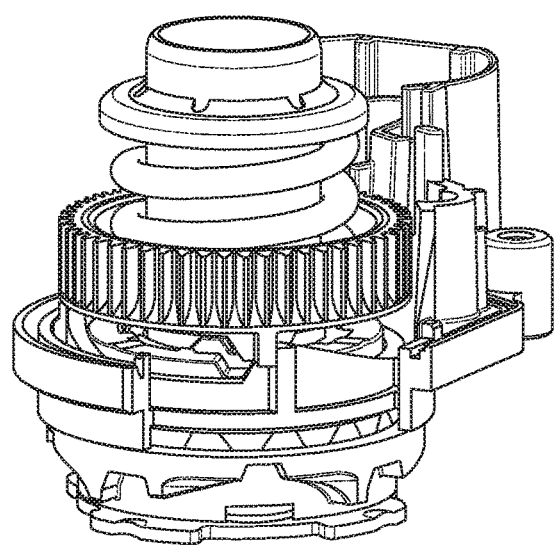
Figure 8A:
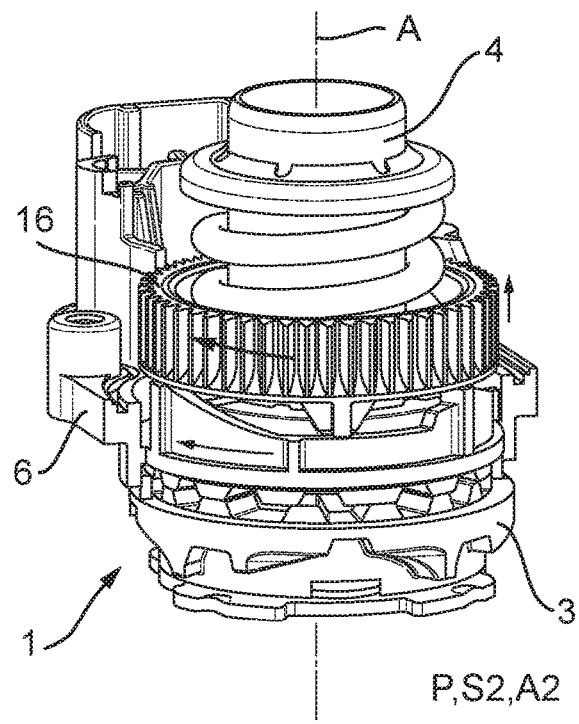

In the figures, like or corresponding parts are denoted with the same reference numerals. In FIGS. 3a-3d, FIGS. 5a-5d, and FIGS. 8a-8d, because of the scale, only a limited set of reference numerals are represented. However, FIG. 3a, FIG. 5d and FIG. 8a are equal to FIG. 2, and FIG. 3d and FIG. 5a are equal to FIG. 4, in which for reference of the components shown in the figures comprehensive sets of reference numerals are represented. In FIGS. 3a-3d, FIGS. 5a-5d, and FIGS. 8a-8d, these reference numerals are disclosed by this reference.

It is noted that the figures are only shown by way of exemplary embodiment and should not be seen as limiting in any way.

Figure 1:
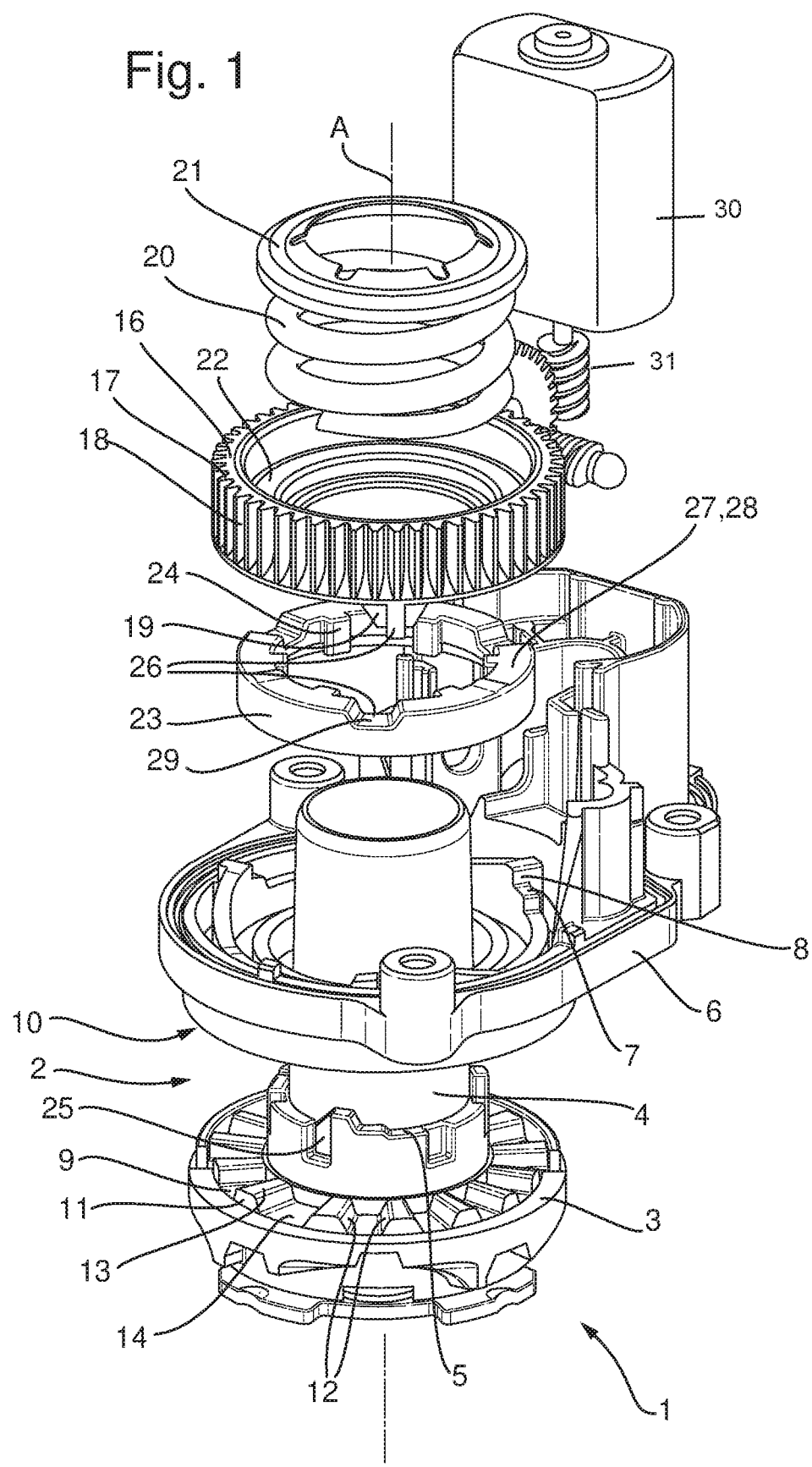
FIG. 1 shows a schematic perspective exploded view of an adjustment instrument according to the invention.

FIG. 1 shows a schematic perspective exploded view of an adjustment instrument 1 for an exterior vision unit of a vehicle. FIG. 2 shows the adjustment instrument of FIG. 1 in assembled condition. Referring to FIG. 1 and FIG. 2, and for supplementary perspective to FIG. 4, FIG. 9a and FIG. 9b, the adjustment instrument 1 comprises a base 2. The base 2 comprises a foot 3 and base shaft 4 extending therefrom along a geometric longitudinal axis A. The base 2 is provided with a base cam track 5.

The adjustment instrument 1 furthermore comprises a housing 6 which surrounds the base shaft 4. The housing 6 is placed on the foot 3. The housing 6 is pivotable around the longitudinal axis A of the base shaft 4 in an adjustment range, between a park position P and an overfold position O, via an intermediate drive position D, represented in FIG. 2. The housing 6 is furthermore provided with a housing cam track 7. The housing cam track 7 is provided with oblique flanks 8 near a position corresponding to the drive position D.

The foot 3 and the housing 6 each are provided with a base cam ring 9 and a housing cam ring 10, respectively. The cam rings 9,10 interlock in the adjustment range only in the drive position D, shown in FIG. 2. Upon pivoting of the housing 6 relative to the base 2 from the drive position D along the longitudinal axis, the cam rings 9,10 move apart, and upon further pivoting, the cam rings 9,10 are supported on each other in a raised axial position H of the housing 6 on the longitudinal axis A relative to the foot 3 of the base 2. The raised axial position H is, for instance, represented in FIG. 4.

The base cam ring 9 and housing cam ring 10 each comprise a plurality of cams 11 each comprising oblique flanks 12 and plane tops 13 located flush, in a flat plane. Successive cams 11 are placed in the ring with mutually different interspaces 14. The cams 11 and interspaces 14 of the cam rings 9,10 interlock in the adjustment range between park position P and the overfold position O only in the drive position D, shown in FIG. 2. Upon pivoting of the housing 6, through cooperation of the tops 13 with the flanks 12, the tops 13 of the cam rings 9,10 move apart. Upon further rotation, the cam rings 9,10 are always supported on each other via tops 13 of the cams 11 in the raised axial position H.

The adjustment instrument furthermore comprises an electric drive unit, not represented in the figures, which is included in the housing 6. The drive unit is provided with an output element, also not represented in the figures, in particular a worm wheel, for electrically adjusting the instrument.

The adjustment instrument further comprises a driving ring 16 which surrounds the base shaft 4. The driving ring 16 cooperates at its circumference 17 with the output element of the electric drive unit. To that end, the driving ring 16 is provided with a toothing 18 at its circumference 17 on the face thereof. The driving ring 16 is further provided with force transmission cams 19. The driving ring 16 is adjustable with the aid of the electric drive in a limited angular stroke S relative to the housing 6 and the base. The driving ring 16 is adjustable about the base shaft 4 between a first angular position S1, corresponding to the drive position D, in which the force transmission cams 19 are supported on the housing cam track 7, and a second angular position S2 in which the force transmission cams 19 are supported on the base cam track 5.

In FIGS. 6a and 7b, and in particular in FIGS. 9a and 9b, it can be clearly seen that the force transmission cams 19 in each case extend relative to the base shaft 4 in radial direction between a radially more inwardly located part which cooperates with the radially more inwardly located base cam track 5 and a radially more outwardly located part which cooperates with the radially more outwardly located housing cam track 7. Thus, each force transmission cam 19 can cooperate in different angular positions with the base cam track 5 and/or the housing cam track 7.

The adjustment instrument additionally comprises a spring 20, in particular a helical spring. The spring 20 surrounds the base shaft 4, and is tensioned between a spring cup 21 secured on the base shaft 4 and the upper side 22 of the driving ring 16. The spring 20 exerts a spring force on the driving ring 16 along the longitudinal axis A in the direction of the foot 3.

The adjustment instrument 1 also comprises a locking ring 23. The locking ring 23 surrounds the base shaft 4, and is in-between the housing 6 and the driving ring 16. The locking ring 23 is nonrotatably coupled with the base 2 via radially inwardly extending ridges 24 which extend axially slidably in slots 25 of the base 2. The locking ring 23 is received in the slots 25 so as to be slidable via its ridges 24 along the longitudinal axis A. The locking ring 23 is thus slidable between a first axial position A1 (shown in FIG. 2), corresponding to the drive position D, in which the locking ring 23 leaves the driving ring 16 free, and a second axial position A2 (for instance shown in FIG. 4) in which it locks the driving ring 16 against rotation disengageably with the aid of a break coupling 26. In the drive position D the upper surface 27 of the locking ring 23, with respect to the longitudinal axis A, is axially below the base cam track 5.

An upper surface 27 of the locking ring 23 is provided with a locking ring cam track 28. The base cam track 5, the locking ring cam track 28 and the housing cam track 7 are concentric, and succeed each other relative to the longitudinal axis A in radially outward direction. When the break coupling 26 has disengaged (also: uncoupled) and the driving ring 16 is not rotation-locked with the locking ring 23, the force transmission cams 19 cooperate force-transmissively with the locking ring cam track 28, and the spring force is transmitted via the locking ring 23 onto the housing 6 (shown in FIG. 8c).

In the first axial position A1 corresponding to the drive position D, the locking ring 23 leaves the driving ring 16 free. In the second axial position A2, the locking ring 23 locks the driving ring 16 via the break coupling 26 disengageably against rotation. The break coupling 26 is implemented as a series of recesses 29 in the locking ring 23. In these recesses 29 the force transmission cams 19 in the second axial position A2 can be restrained from rotation, and they are locked disengageably against the action of the spring 20.

Figure 3C:
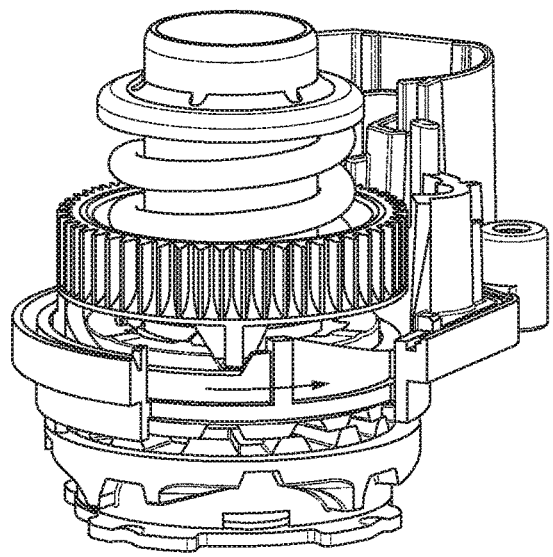
Figure 3D:
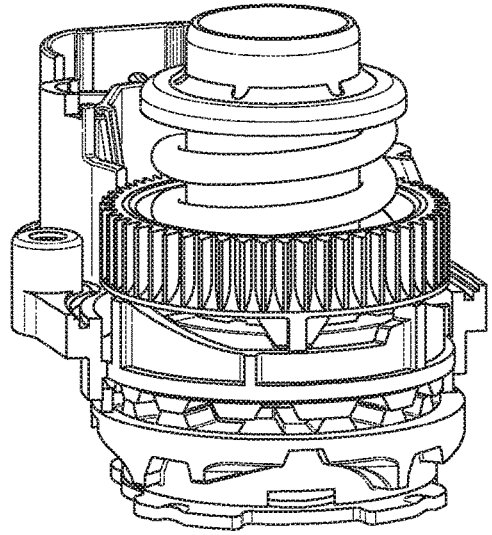

Referring to FIGS. 3a-3d and the arrows depicted therein, upon electric adjustment of the instrument from the drive position D (FIG. 3a) to the park position P (FIG. 3d), the driving ring 16 is adjusted with the aid of the electric drive relative to both the housing 6 and the base 2. The adjustment starts from the first angular position S1. In the first angular position S1, the force transmission cams 19 are supported on the housing cam track. The interlock of the cam rings 9,10 is thereby energized directly. During adjustment, the driving ring 16 pivots to the second angular position S2 (FIG. 3b) in which the force transmission cams 19 are supported on the base cam track 5. The cam rings 9,10 are then left free, and their interlock is not energized anymore. Upon further electric adjustment the cam rings 9,10 move apart (FIG. 3c). The locking ring 23, which rests on the housing 6, is thereby brought in the second axial position A2. The locking ring 23 now locks the driving ring 16 relative to the base 2 against rotation. Next, upon further electric adjustment, the housing 6 pivots relative to the base 2 to the park position P (FIG. 3d).

In FIG. 4 it is shown that the adjustment instrument 1 is in the park position P. The cam rings 9,10 are on each other. The force transmission cams 19 are supported by their undersides on the housing ring. In particular, they are not supported on the locking ring 23. The spring 20 hence does not press on the locking ring 23, and the locking ring 23 does not press on the housing.

In FIGS. 5a-5d and with the arrows depicted therein, it is shown how upon electric adjustment the adjustment instrument is adjusted from the park position P FIG. 5a to the drive position D FIG. 5d. In principle, this is the reverse movement of FIG. 3a-FIG. 3d. Referring to FIG. 5a, the driving ring 16 is driven by the drive unit, which pushes off from the housing 6. Consequently, the driving ring 16 seeks to rotate anticlockwise, but is held in place by break coupling 26: the recesses 29 in the upper surface 27 of the locking ring 23 restrain the force transmission cams 19 of the driving ring 16 from rotation. As a result, the housing 6 starts to rotate clockwise.

It is noted that the housing cam track 7 is provided with oblique flanks 8 near the position corresponding to the drive position D. Upon the electric adjustment shown from the park position P to the drive position D, the housing 6 pivots to the drive position D, and the force transmission cams 19 cooperate via upstanding flange edges 15 with the oblique flanks 8 of the housing cam track 7. Through the movement of the flange edges 15 of the force transmission cams 19 along the housing cam track, the housing cam ring 10 and the base cam ring 9 are pressed into each other (FIG. 5*b*). The locking ring 23 thereby moves to the first axial position A1 and releases the driving ring 16 restrained from rotation. The driving ring 16 thereby rotates counterclockwise through a limited stroke from the second angular position S2 in which the force transmission cams 19 are supported on the base cam track 5 and leave the cam rings 9,10 free (FIG. 5*c*), to the first angular position S1 in which the force transmission cams 19 are supported on the housing cam track 7 and energize the cam rings 9,10 (FIG. 5*d*). The flange edge 15 runs against a corresponding flange edge on the housing, and the electrically driven adjustment stops, for instance through a current limiting circuit in the drive. The locking ring 23 in this position is free of spring force: the spring force is transmitted directly from the force transmission cams 19 which are supported by their undersides on the housing.

In FIGS. 6*a*-6*b* and with the arrows depicted therein, it is shown how upon manual adjustment the adjustment instrument 1 under the influence of a force exerted externally on the housing 6 can be brought from the drive position D to the overfold position O. Under the influence of the external force the housing 6 starts to rotate in the direction of the arrows to the overfold position O, and through cooperation of the tops 13 with the oblique surfaces of the cams 11 the cam rings 9,10 move apart to the raised axial position H. The force transmission cams 19 move up along with the housing 6, and are thereby lifted from the housing cam track 5, so that they are not stopped by the flank of the housing cam track 5 corresponding to the drive position. The force transmission cams 19 further remain clear of the locking ring 23, which moves up along with the housing 6. Upon further pivoting, the cam rings 9,10 are supported on each other. The spring force is transferred directly via the force transmission cams 19 onto the housing 6, so that the mutually supported cam rings 9,10 are energized.

In FIGS. 7*a*-7*b* and with the arrows depicted therein, it is shown how upon manual adjustment the adjustment instrument 1 under the influence of a force exerted externally on the housing 6 can be brought from the drive position D to the park position P. In FIGS. 6*a*-6*b* and with the arrows depicted therein, it is shown how upon manual adjustment the adjustment instrument 1 under the influence of a force exerted externally on the housing 6 can be brought from the drive position D to the park position P. Under the influence of the external force the housing 6 starts to rotate in the direction of the arrows to the park position P, and through cooperation of the tops 13 with the oblique surfaces of the cams 11 the cam rings 9,10 move apart to the raised axial position H. The force transmission cams 19 move up along with the housing 6, and are thereby lifted from the housing cam track, so that they are not stopped by the housing cam track. The force transmission cams 19 further remain clear of the locking ring 23, which moves up along with the housing 6. Upon further pivoting, the cam rings 9,10 are supported on each other. The spring force is transferred directly via the force transmission cams 19 onto the housing 6, so that the mutually supported cam rings 9,10 are energized.

Figure 8B:
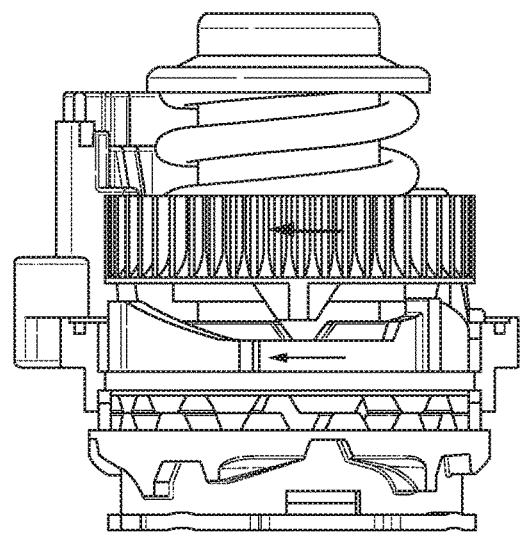
Figure 8C:
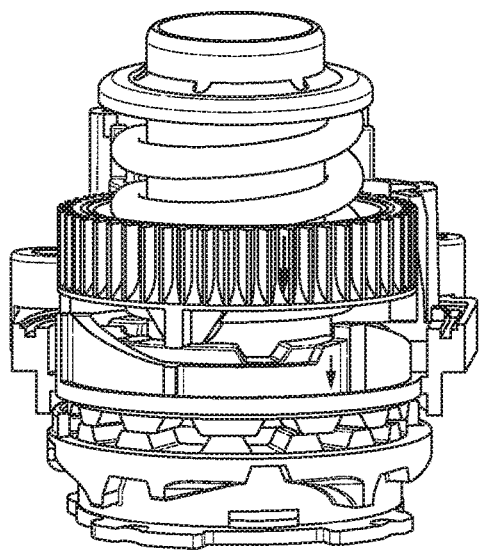
Figure 8D:
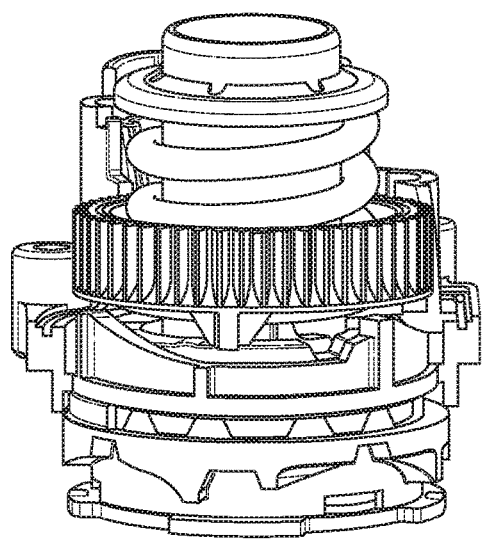

In FIGS. 8*a*-8*d* and with the arrows depicted therein, it is shown how with the adjustment instrument 1 under the influence of a manually externally exerted force, adjustment by hand is done from the park position P FIG. 8*a* to a manual drive position hD deviating from the normal drive position D, of FIG. 8*d*. Under the influence of the force exerted externally on the housing 6, the housing 6 seeks to rotate clockwise. The driving ring 16 is carried along via the drive by the housing 6, but is restrained from rotation by the locking ring 23. As a result, the break coupling disengages: the force transmission cams 19 of the driving ring 16 run up, against spring action, on the oblique flanks 8 of the recess 29 in the upper surface 27 of the locking ring 23 (FIG. 8*b*). The necessary uncoupling forces and forces exerted externally on the drive can, by use of a relatively gently inclined and shallow recess 29, be chosen relatively low, so that these components can be made relatively light in construction.

The force transmission cams 19 are thereupon supported on the upper surface 27 of the locking ring, and the driving ring 16 can rotate along with the housing 6 relative to the base 2 and the locking ring 23. When break coupling 26 has thus disengaged and the driving ring 16 is not rotation-locked with the locking ring 23, the force transmission cams 19 cooperate force-transmissively with the locking ring cam track 28, and transmit the spring force via the locking ring 23 onto the housing 6 (FIG. 8*c*). Upon further rotation the cam rings 9,10 interlock under this spring action, so that a manual drive position D is reached in a manner unequivocal to the user and well defined.

Thus, an adjustment instrument for an exterior vision unit for a vehicle is provided. The adjustment instrument comprises a housing which is pivotably adjustable relative to a base between a park position and an overfold position via a drive position. The adjustment instrument furthermore comprises an electric drive unit provided in the housing, which cooperates via an output element with a driving ring provided with force transmission cams. The force transmission cams in the drive position are supported on a housing cam track of the housing, and during electrically driven pivoting of the housing are supported on a base cam track of the base. In and near the drive position, the force transmission cams can cooperate directly with the housing.

The invention is not limited to the exemplary embodiment represented here. Many variants are possible, and will be clear to one skilled in the art, within the scope of the appended claims.

REFERENCE NUMERALS 1 adjustment instrument
2 base
3 foot
4 base shaft
5 base cam track
6 housing
7 housing cam track
8 oblique flanks
9 base cam ring
10 housing cam ring
11 cams
12 oblique flanks
13 plane tops
14 interspaces
15 flange edge 16 driving ring
17 circumference
18 toothing
19 force transmission cams
20 spring
21 spring cup
22 upper side
23 locking ring
24 ridges
25 slots
26 break coupling
27 upper surface
28 locking ring cam track
29 recesses
A geometric longitudinal axis
P park position
O overfold position
D drive position
H raised axial position
S limited angular stroke
S1 first angular position
S2 second angular position
A1 first axial position
A2 second axial position

The invention claimed is:

1. An adjustment instrument for an exterior vision unit for a vehicle, comprising:
    a base, comprising a foot and a base shaft extending therefrom along a longitudinal axis, the base is provided with a base cam track,
    a housing surrounding the base shaft, which is placed on the foot and which is pivotable in an adjustment range around the longitudinal axis of the base shaft, between a park position and an overfold position, via an intermediate drive position, the housing is furthermore provided with a housing cam track, wherein
    the housing and the foot are each provided with a housing cam ring and a base cam ring, respectively, which in the adjustment range interlock only in the drive position, and which upon pivoting of the housing relative to the base from the drive position along the longitudinal axis move apart, and upon further pivoting are supported on each other in a raised axial position, furthermore comprising
    an electric drive unit which is included in the housing, provided with an output element for electrically adjusting the instrument,
    a driving ring surrounding the base shaft, which cooperates at its circumference with the output element of the electric drive unit, and which is provided with force transmission cams, wherein the driving ring with the aid of the electric drive is adjustable through a limited angular stroke relative to the housing and the base, between a first angular position corresponding to the drive position, in which the force transmission cams are supported on the housing cam track, and a second angular position in which the force transmission cams are supported on the base cam track,
    a spring which surrounds the base shaft and which exerts a spring force on the driving ring along the longitudinal axis in the direction of the foot,
    a locking ring surrounding the base shaft, which is located between the housing and the driving ring, and which is nonrotatably coupled with the base and which is slidable along the longitudinal axis between a first axial position, corresponding to the drive position, in which the locking ring leaves the driving ring free, and a second axial position in which it locks the driving ring against rotation disengageably via a break coupling,
    wherein upon electric adjustment of the instrument from the drive position to the park position, the driving ring is adjusted with the aid of the electric drive relative to the housing and the base from the first angular position in which the force transmission cams are supported on the housing cam track and energize the cam rings directly, to the second angular position in which the force transmission cams are supported on the base cam track and leave the cam rings free, and wherein upon further electric adjustment the cam rings move apart and thereby bring the locking ring in the second axial position so that the locking ring locks the driving ring relative to the base against rotation, and the housing is thereupon pivoted relative to the base to the park position.

2. The adjustment instrument according to claim 1, wherein the housing cam track is provided with oblique flanks near a position corresponding to the drive position, and wherein upon electric adjustment from the park position to the drive position, the housing pivots to the drive position, and the force transmission cams cooperate with the oblique flanks of the housing cam track so as, through the movement of the force transmission cams along the housing cam track, to press the housing cam ring and the base cam ring into each other, whereby the locking ring moves to the first axial position and releases the driving ring against rotation, and the driving ring moves from the second angular position in which the force transmission cams are supported on the base cam track and leave the cam rings free, to the first angular position and in which the force transmission cams are supported on the housing cam track and energize the cam rings.

3. The adjustment instrument according to claim 1, wherein the break coupling is implemented as recesses in the locking ring in which the force transmission cams in the second axial position are restrained from rotation, and are locked disengageably against the action of the spring.

4. The adjustment instrument according to claim 1, wherein an upper surface of the locking ring is provided with a locking ring cam track, and when the break coupling has disengaged and the driving ring is not rotation-locked with the locking ring, the force transmission cams cooperate force-transmissively with the locking ring cam track, and the spring force is transmitted via the locking ring onto the housing.

5. The adjustment instrument according to claim 4, wherein the base cam track, the locking ring cam track and the housing cam track succeed each other relative to the longitudinal axis in radially outward direction.

6. The adjustment instrument according to claim 1, wherein the base cam ring and the housing cam ring each comprise oblique flanks and flush plane tops, and wherein successive force transmission cams are placed in the cam rings with mutually different interspaces, wherein the cams and interspaces of the cam rings interlock in the adjustment range between the park position and the overfold position only in the drive position, and wherein upon pivoting of the housing, through cooperation of the flush plane tops with the oblique flanks, the flush plane tops of the cams move apart and upon further rotation the cam rings are always supported on each other via the oblique tops of the cams.

7. An exterior view unit for a motor vehicle, comprising an adjustment instrument according to claim 1, and a mirror, display or camera coupled with the housing.

8. The adjustment instrument according to claim 3, wherein the housing cam track is provided with oblique flanks near a position corresponding to the drive position, and wherein upon electric adjustment from the park position to the drive position, the housing pivots to the drive position, and the force transmission cams cooperate with the oblique flanks of the housing cam track so as, through the movement of the force transmission cams along the housing cam track, to press the housing cam ring and the base cam ring into each other, whereby the locking ring moves to the first axial position and releases the driving ring against rotation, and the driving ring moves from the second angular position in which the force transmission cams are supported on the base cam track and leave the cam rings free, to the first angular position and in which the force transmission cams are supported on the housing cam track and energize the cam rings.

9. The adjustment instrument according to claim 4, wherein the housing cam track is provided with oblique flanks near a position corresponding to the drive position, and wherein upon electric adjustment from the park position to the drive position, the housing pivots to the drive position, and the force transmission cams cooperate with the oblique flanks of the housing cam track so as, through the movement of the force transmission cams along the housing cam track, to press the housing cam ring and the base cam ring into each other, whereby the locking ring moves to the first axial position and releases the driving ring against rotation, and the driving ring moves from the second angular position in which the force transmission cams are supported on the base cam track and leave the cam rings free, to the first angular position and in which the force transmission cams are supported on the housing cam track and energize the cam rings, and wherein the break coupling is implemented as recesses in the locking ring in which the force transmission cams in the second axial position are restrained from rotation, and are locked disengageably against the action of the spring.

10. The adjustment instrument according to claim 5, wherein the housing cam track is provided with oblique flanks near a position corresponding to the drive position, and wherein upon electric adjustment from the park position to the drive position, the housing pivots to the drive position, and the force transmission cams cooperate with the oblique flanks of the housing cam track so as, through the movement of the force transmission cams along the housing cam track, to press the housing cam ring and the base cam ring into each other, whereby the locking ring moves to the first axial position and releases the driving ring against rotation, and the driving ring moves from the second angular position in which the force transmission cams are supported on the base cam track and leave the cam rings free, to the first angular position and in which the force transmission cams are supported on the housing cam track and energize the cam rings, wherein the break coupling is implemented as recesses in the locking ring in which the force transmission cams in the second axial position are restrained from rotation, and are locked disengageably against the action of the spring, and wherein an upper surface of the locking ring is provided with a locking ring cam track, and when the break coupling has disengaged and the driving ring is not rotation-locked with the locking ring, the force transmission cams cooperate force-transmissively with the locking ring cam track, and the spring force is transmitted via the locking ring onto the housing.

* * * * *